United States Patent [19]
Parker, Jr.

[11] 3,919,899
[45] Nov. 18, 1975

[54] SELF ALIGNING PLANETARY GEAR DIFFERENTIAL

[76] Inventor: Bruce H. Parker, Jr., 1000 Paradise Road, Swampscott, Mass. 01907

[22] Filed: Dec. 5, 1973

[21] Appl. No.: 422,016

[52] U.S. Cl. .............................. 74/713; 74/710.5
[51] Int. Cl. ........................ F16h 1/40; F16h 1/44
[58] Field of Search .......... 74/710, 710.5, 711, 713; 180/44 R, 24.08, 24.09; 192/35

[56] References Cited
UNITED STATES PATENTS

| | | | |
|---|---|---|---|
| 1,198,983 | 9/1916 | Winsor | 74/710 X |
| 1,817,028 | 3/1927 | Brockway | 74/710 |
| 2,542,157 | 9/1948 | Odom | 74/710 |

FOREIGN PATENTS OR APPLICATIONS

| | | | |
|---|---|---|---|
| 1,068,567 | 11/1959 | Germany | 74/710.5 |
| 498,044 | 11/1950 | Belgium | 180/44 R |
| 447,633 | 4/1948 | Canada | 74/710.5 |

*Primary Examiner*—Samuel Scott
*Assistant Examiner*—P. S. Lall
*Attorney, Agent, or Firm*—Thomas C. Stover, Jr.

[57] ABSTRACT

A self-aligning planetary gear differential axle assembly for a pair of drive wheels is provided wherein each wheel is connected by a hollow axle to the planetary gear system, and a continuous central shaft passes through the hollow axles and the planetary gear assembly to strengthen and align the same.

21 Claims, 10 Drawing Figures

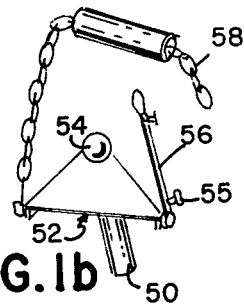
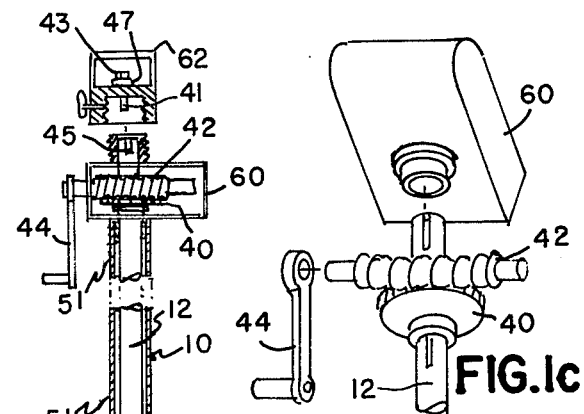
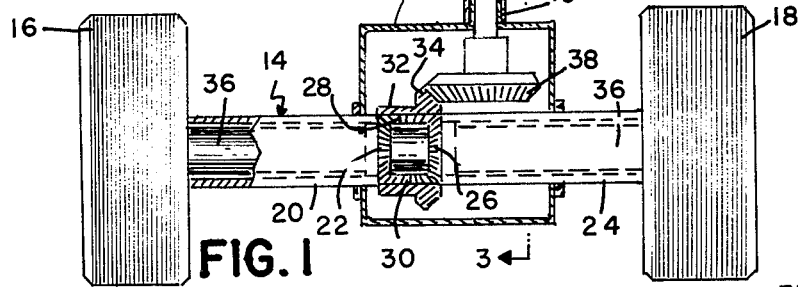
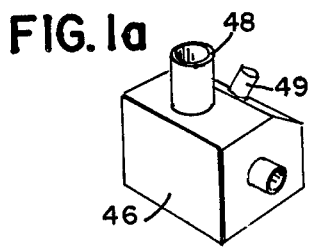
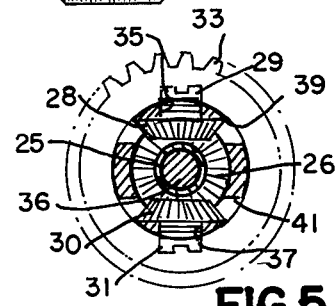
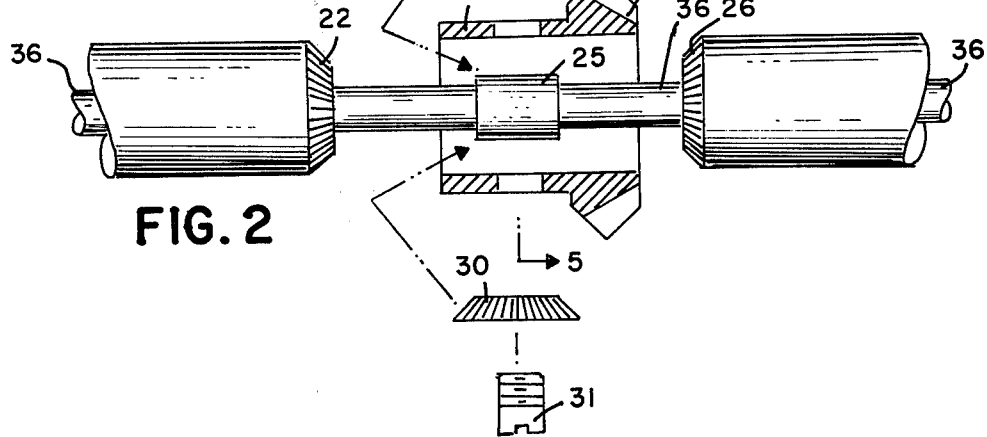

3,919,899

SELF ALIGNING PLANETARY GEAR DIFFERENTIAL

FIELD OF THE INVENTION

This invention relates to a gear differential for an axle, particularly a planetary gear differential for an axle.

THE PRIOR ART

The conventional planetary gear differential system is a well-known solution to an old problem. When a pair of wheels on an axle turn, one wheel must rotate on a shorter radius, i.e. slower than the other or the inside wheel must turn in place and scuffing occurs. Scuffing causes friction and vibration problems, tire wear, hard steering, difficulty of control and of turning. The solution has been the planetary gear arrangement commonly used in motor vehicles which employs two aligned and spaced separate axles which are joined by horizontal bevel gears which mesh with vertical gears mounted on each axle and engage a drive gear; this gear assembly being surrounded by a heavy metal case which braces and holds the axles in alignment. This case is expensive to machine, is heavy and, because of its size, requires considerable separation between wheels to make room for same. Because of the room required, wheels which are mounted close together, e.g. one foot apart or nearer, cannot contain such yoke except in toy vehicles and either scuff or use free wheeling on one wheel. Even where the wheels are sufficiently far apart, the yoke is an expensive, heavy addition which must be carefully machined so that the axles will not be misaligned.

There is, therefore, a need and a market for a planetary gear differential which is more compact and obviates the above shortcomings. Accordingly, there has now been developed a planetary gear differential which provides dependable self-alignment since it utilizes one axle instead of two and can be employed between wheels which are close together as well as farther apart.

SUMMARY

Broadly, the invention provides a self-aligning planetary gear differential axle assembly comprising, a pair of spaced aligned hollow axles, the axles terminating inwardly in spaced opposed axle bevel gears, at least one bevel spider gear sized and positioned to engage both axle bevel gears in a planetary assembly and a continuous floating shaft passing axially through both said hollow axles and said planetary gear assembly for strengthening and maintaining the alignment of said differential axle assembly.

DESCRIPTION

The invention will become more apparent from the following detailed specification and drawings in which:

FIG. 1 is an elevation view partly in section of the self-aligning planetary gear differential system embodying the present invention;

FIGS. 1a, 1b and 1c are isometric views of components of the embodiment of FIG. 1.

FIG. 2 is an exploded sectional elevation view of a portion of the embodiment shown in FIG. 1;

FIG. 5 is an end view of the gear of FIG. 2 taken on lines 5—5 looking in the direction of the arrows;

Figure 3:
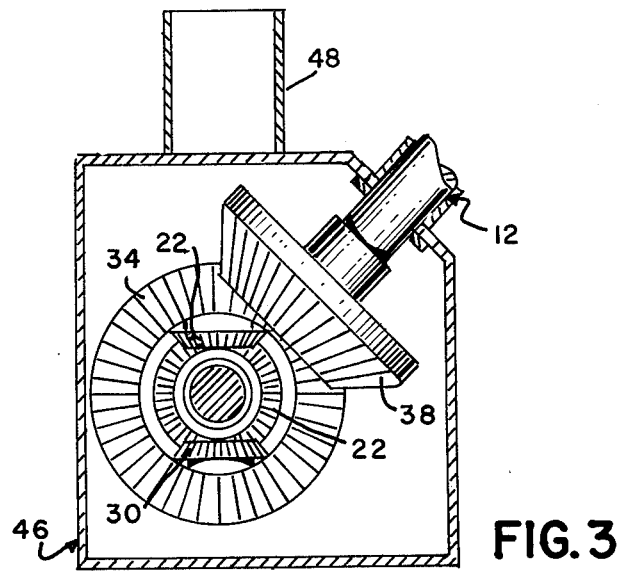
FIG. 3 is an elevation view partially in section of the embodiment of FIG. 1 taken on lines 3—3 looking in the direction of the arrows.

Referring now to the drawings, dolly 10 has drive gear assembly 12 connecting with axle assembly 14 which rides on a pair of wheels 16 and 18 as shown in FIG. 1. Wheel 16 has hollow axle 20 extending therefrom which terminates in bevel gear 22 and wheel 18 has hollow axle 24 extending therefrom which terminates in bevel gear 26 as shown in FIG. 1. The bevel gears 22 and 26 are linked and engaged by a pair of opposed planetary gears 28 and 30, the planetary gears being securely held in such an engagement by sleeve 32 which carries a ring drive gear 34 thereon so that the ring drive gear 34 rotates with the planetary gears 28 and 30 as shown in FIGS. 1, 2 and 3. To strengthen and stabilize the axle assembly 14, as well as to align the axles 20 and 24 and their respective bevel gears 22 and 26, there is provided as an important feature of the present invention, continuous axle 36 which runs through the bore of both hollow axles 20 and 24 and yet freely rotates independent thereof, i.e. floats, as shown in FIG. 1. In such planetary gear arrangement, the bevel gears 22 and 26 and planetary gears 28 and 30 are able to rotate in engagement with each other without slippage when axle assembly 14 and wheels 16 and 18 rotate and travel in a straight path or travel in an arc, i.e., turn a corner, without scuffing or related problems, the axle assembly being strengthened and held in alignment by the continuous axle 36.

To power and steer dolly 10, drive shaft 12 terminates in drive gear 38 which engages ring drive gear 34 as shown in FIG. 1. At the upper or other end of drive shaft 12 is mounted ring gear 40 which is powered by worm gear 42 connected to hand crank 44, all as shown in FIG. 1. Also provided for dolly 10 is lower housing 46 which contains and protects the planetary gear differential axle assembly and carries socket 48 for receiving insert 50 of trailer hitch 52 which has ball 54, lever clamp 56 and safety clamp chain 58 all as shown in FIGS. 1, 1a, 1b and 3. The upper gear assembly is provided with housing 60 for containing the ring and upper worm gears 40 and 42 and shift handle 62, which is employed in pulling the drive shaft 12 and the drive gear 38 out of engagement with axle drive gear 34 when it is desirable to have the dolly 10 freely roll out of gear, also as shown in FIGS. 1 and 1c, shaft bundle 62 contains screw 41 which passes through nut 43 and washer 47 into slot 45 of the drive shaft 12, as shown in FIG. 1. Sleeve 51 surrounds the shaft 12 as positioned by concentric annular spacer 49, as shown in FIG. 1.

In an exploded sectional view, the planetary gear differential system is illustrated in FIG. 2, wherein planetary gears 28 and 30 rotate respectively around axis pins 29 and 31 within sleeve 32 and cylindrical bushing or bearing 25 bears against the leading surfaces of bevel gears 22 and 26 and keeps them the desired distance apart for suitable engagement with the planetary gears 28 and 30.

Figure 4:
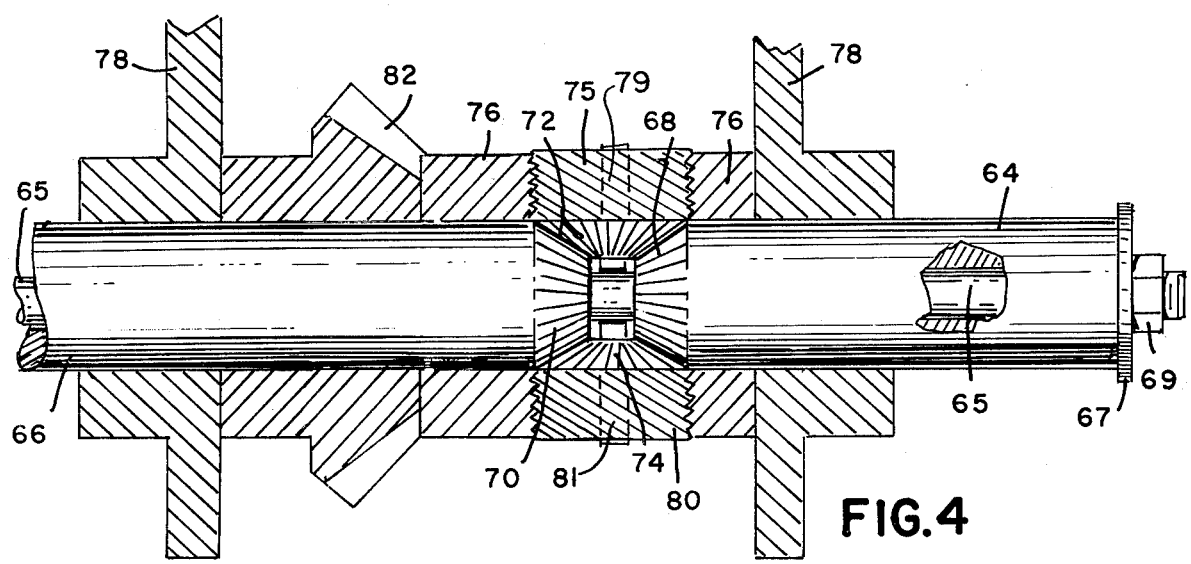
FIG. 4 is an elevation view partially in section of another embodiment of the self-aligning planetary gear differential system of the invention.

In another embodiment of the present invention, hollow axles 64 and 66 which terminate in bevel gears respectively 68 and 70, engage planetary gears 72 and 74, the latter gears being held in place by differential sleeve 76 as shown in FIG. 4. Threaded plugs 75 and 80 screw into sleeve 76 and hold the planetary gears 72 and 74 in secure threaded engagement with beveled gears 68 and 70 and axle pins 79 and 81 screw into their respective plugs and pass through the axes respectively of planetary gears 72 and 74 providing turning axles therefor and securing sleeve 76 to the planetary gears 72 and 74 so that said sleeve rotates with said planetary gears independent of the rotary motion of the hollow axles 64 and 66 as shown in FIG. 4. Ring drive gear 82 is affixed to the sleeve 76, though offset a distance from the planetary gears, such that a driving force applied to ring drive gear 82 rotates the sleeve and revolves the planetary gears 72 and 74, which act on the hollow axles 64 and 66 as discussed above. Passing through the hollow axles 64 and 66 is continuous unifying aligning and floating axle or shaft 65. The planetary differential gear assembly is enclosed in housing 78 as shown in FIG. 4. Note that hollow axles 64 and 66 are attached to their respective wheels (not shown) and rotate accordingly.

The ring drive gear 34 of FIGS. 1 and 2, as shown in an enlarged view in FIG. 5, has aperture 35 for insertion of axle pin 29 therethrough and aperture 37 for insertion of axle pin 31 therethrough as well as apertures 39 and 41 for insertion respectively of planetary gears 28 and 30 therein; the ring gear having teeth 33 as shown.

Referring again to FIG. 4, a bushing (not shown) can serve to hold the sleeve gears the desired distance apart and end plates, e.g. plate 67, urged by threaded nut 69, serve to urge the sleeve gears, e.g. gear 68, inwardly in suitable engagement with planetary or spider gears 72 and 74. The threaded nut 69 can be replaced by a bolt adjustable clamp if desired.

Figure 6:
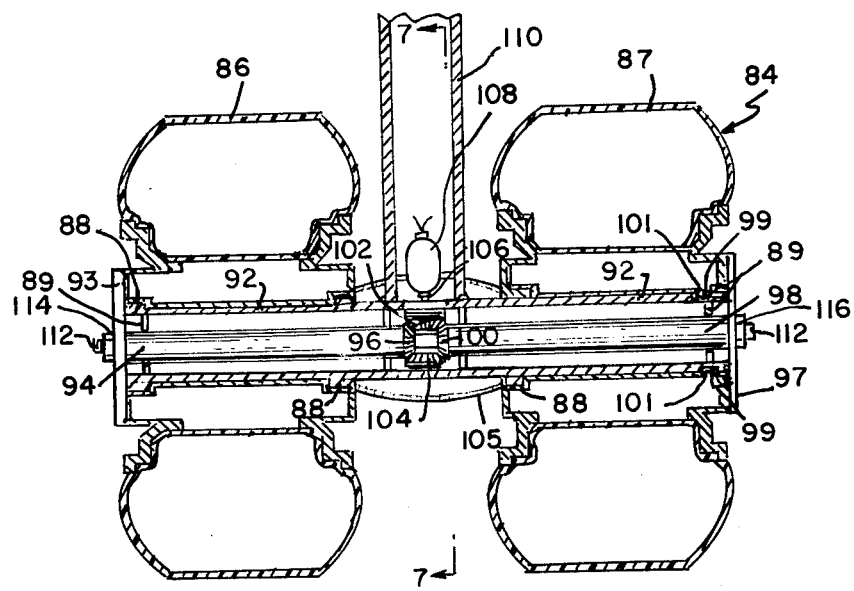
FIG. 6 is a sectional elevation end view of still another embodiment of the present invention.

In another embodiment of the invention, air craft landing gear 84 has a pair of wheels 86 and 87 respectively which rotate on ring bearings 88 around axle tube 92 which is fixedly mounted to landing gear leg 110, as shown in FIG. 6. Wheel 86 is fastened by end plate 93 to hollow axle 94 which terminates in bevel gear 96 and wheel 88 is fastened by end plate 97 to hollow axle 98 which terminates in bevel gear 100 as shown in FIG. 6. Hollow axle 94 and axle tube 92 are separated by bearings 89, also shown in FIG. 6. The enclosed bevel gears 96 and 100 are engaged by at least one planetary gear 102 which is mounted within ring gear 104 and rotates with said planetary gear, all within the axle tube 92, as shown in FIG. 6.

Figure 7:
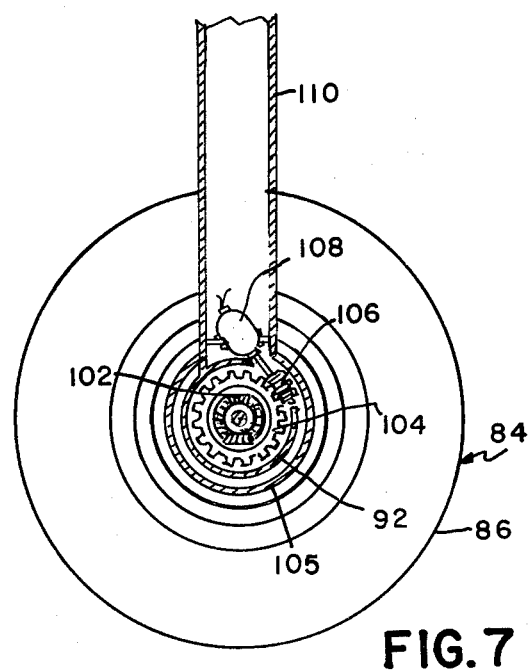
FIG. 7 is an end fragmentary sectional view of the embodiment of FIG. 6.

Axle tube 92 has a slot in it (FIG. 7) which permits the ring gear 104 to be engaged by worm gear 106 shown in FIG. 6 and 7 which drives said ring gear 104, the planetary gear 102, the engaged bevel gears 96 and 100 and thus the wheels 86 and 87. The worm gear 106 is driven by electric motor 108 positioned within the landing gear leg 110, also as shown in FIG. 6. Protective shell 105 encloses the planetary gear system and the worm gear 106 in contact therewith.

The ring gear 104, alternatively, can be driven by a longer worm gear which extends from said ring gear further up the leg 110 to a more remote power source which can be a motor, engine or power take-off from the air craft's existing power source.

Unifying, strengthening and aligning the hollow axles 94 and 98 is continous floating shaft 112. Nuts 114 and 116 on said shaft 112 secure the end plates 93 and 97 and the hollow axle 94 and 98 as shown in FIG. 6. However, in the particular embodiment of FIGS. 6 and 7, the floating shaft 112 can be removed because continuous axle tube 92 can serve as a substitute therefor provided the end plates 93 and 97 are rotatably held in position at the ends of axle tube 92, (e.g. by bearing collar 99 riding in groove 101 as shown in FIG. 6), such tube being non-rotating, the end plates and their hollow axles 94 and 98 being rotatable, with sufficient lubricant or bearings preferably placed between axle tube 97 and hollow axles 94 and 98.

From the above, it can be seen that the planetary gear differential assembly of the invention performs up to par, i.e. permits transmissions of power to both wheels, and, on turns, transmits power to the faster turning wheel without slippage and without scuffing of the inside slower turning wheel. Yet the differential of the present invention, due to the novel continuous floating axle passing through the hollow axles and gear assembly, is self-aligning, adds great strength and stability to the differential system and permits more simplified milling of the component parts thereof. Moreover, the heavy, costly, highly machined conventional case, to enclose the gear differential system, is no longer required and can be replaced with a light, small, low-cost sleeve over the gear assembly and a pair of pillow block bearings spaced apart on the hollow axles.

The differential of the invention can be employed with a pair of closely spaced wheels, e.g. a dolly or airplane landing gear and, as well, is advantageously employed in the driven axles of motor vehicles to lighten the weight and lower the cost and maintenance thereof. The differential of the invention can also be employed with various other wheeled vehicles large and small, including toy vehicles. Thus, where toy racing cars have formerly had a choice between free-wheeling, non-driven axles or driven axles which could not differentiate wheel speeds on turns with resultant scuffing and jumping off course, the present invention provides a differential which is self-aligning, light weight and low cost, in other words, practical for such toys.

As stated above, aircraft landing gears can employ the differential of the present invention and thus be driven by a small motor. Presently, these wheels can contain no gear differential system and planes must be pushed around runways by motor vehicles until or unless the air craft's own engines are functioning, (at expensive fuel consumption rates).

As previously disclosed herein, rotational power is transmitted to the planetary gear system through ring drive means, e.g. a ring gear attached to planetary spider gears. Alternatively, the ring gear can be replaced by other ring drive means, e.g. a chain driven sprocket or a belt driven pulley and the like. The ring drive means is powered by drive gear means, e.g. spur gears, bevel gears, worm gears, pulleys, sprockets and the like.

While the hollow axles preferably terminate in bevel gears, these axles can also terminate in spur or other gears. Such gears can be integral with the hollow axles or be separate and mounted therein.

The axle and gear components of the present invention can be made of any rigid durable material such as metal, plastic, wood and the like, preferably metal, e.g. steel, aluminum and the like for vehicles and metal or plastics, e.g. polystyrene for small vehicles and toys.

The dolly such as illustrated in FIG. 1, can be hand-powered, e.g. a crank or have a small motor or engine to power the gear system thereof. Alternatively, the crank can terminate in a worm gear which connects with the ring drive means.

Although bevel gears are preferred as illustrated herein, it will be recognized that spur and other gears can be substituted where desired within the scope of the present invention.

The continuous aligning central shaft of the present invention preferably floats within two hollow axles with suitable lubrication oils or grease therebetween. Though this central shaft is advantageously solid for strength, yet it too can be hollow if desired and of one or more layers of material.

However, the central shaft can be attached to one wheel or hollow axle or the other if desired or for added power and acceleration in vehicles. Advantageously, the continuous central shaft, instead of floating, can be connected to the planetary gears and the associated drive, e.g. ring gear with a solenoid pin or other locking mechanism, each hollow axle which, upon activation thereof, locks the respective hollow axle to the central shaft, (or locks the hollow axle to the ring gear extension, if desired), and drive gear system for added drive power. Alternatively, a ring around said hollow axle can serve to compress hollow axle to central shaft as another such locking mechanism.

For example, in auto racing where a drive wheel becomes airborne and spins as on a turn or where a vehicle wheel is spinning on ice rendering powerless the opposite wheel thereof, such opposite wheel and hollow axle are locked to the central shaft, instantly directing rotational power thereto to provide maximum drive to such vehicle. In addition, both hollow axles can be thus locked to the center shaft for added drive power on a relatively straight course.

The respective gear housings can be small and lightweight and are preferably of metal or plastic and can be dispensed with if desired, the sleeve gear serving to cover the planetary gear assembly.

What Is claimed Is:

1. A continuous self-aligning planetary gear differential axle assembly comprising, a pair of spaced aligned hollow axles, the axles terminating inwardly in spaced opposed axle gears, at least one planetary gear sized and positioned to engage both axle gears in a planetary assembly, a continuous floating central shaft passing axially through both said hollow axles and said planetary gear assembly for strengthening and maintaining the alignment of said differential axle assembly and ring drive means connected to said planetary gear and rotatably mounted around said central shaft.

2. The differential assembly of claim 1 wherein said central shaft is a solid axle.

3. The differential assembly of claim 1 having a pair of opposed beveled planetary gears engaging a pair of opposed axle bevel gears.

4. The differential assembly of claim 1 wherein said hollow axles are each attached to a wheel assembly.

5. The differential assembly of claim 1 wherein said ring drive means is selected from a group consisting of a ring gear, sprocket and pulley.

6. The differential assembly of claim 1 wherein said ring drive means is mounted on a sleeve rotatably mounted around said planetary gear assembly and said central shaft.

7. The differential gear assembly of claim 1 wherein said ring drive means engages drive gear means therefor.

8. The differential assembly of claim 1 wherein a bushing placed between said axle gears separates the same.

9. The differential assembly of claim 1 mounted on a motor vehicle, said hollow axles being each connected to a wheel of a wheel pair of said vehicle, the motor being connected to said ring drive means.

10. The differential assembly of claim 1 mounted in air-craft landing gear, said hollow axles being each connected to a wheel thereof and drive gear means mounted to engage said ring drive means.

11. The differential assembly of claim 1 wherein said hollow axles are each connected to a wheel, drive gear means is mounted to engage said ring drive means, and crank means is mounted to engage said drive gear means to define a dolly such that rotation of said crank means turns said drive gear means, rotates said ring drive means to drive said differential assembly and said wheels.

12. The dolly of claim 11 wherein said crank is mounted to engage a drive shaft, said drive shaft being connected to said drive gear means.

13. The dolly of claim 11 having means to engage and disengage said drive gear means from said ring drive means and having a trailer hitch mounted thereon for moving the same.

14. The dolly of claim 11 wherein a motor mounted thereon drives said drive gear means.

15. The differential assembly of claim 1 wherein an outer hollow shaft extends over and around said differential axle assembly and said center shaft, a pair of spaced wheels rotatably mounted on said outer shaft proximate the ends thereof, one of said wheels being attached to one of said hollow axles, the other of said wheels being attached to the other of said hollow axles, a ring gear attached to said planetary gear and encircling said central shaft, said outer shaft having a slot therein and drive gear means mounted to engage said ring gear through said slot to drive the same.

16. The differential assembly of claim 15 wherein said wheels are air-craft landing wheels mounted on said outer shaft, a hollow support stem connects with said outer shaft between said wheels, and said drive gear means is a worm gear mounted within said stem to define a powered air-craft landing gear.

17. The landing gear of claim 16 wherein an electric motor for driving said worm gear is mounted within said stem.

18. The differential assembly of claim 15 wherein said center shaft is removed from said differential assembly.

19. The differential assembly of claim 1 wherein each axle is connected to a wheel, said planetary gear is connected to said central shaft and locking means are provided for unlocking and locking at least one of said hollow axles to said central shaft.

20. The differential assembly of claim 19 wherein locking means are provided for locking both of said hollow axles to said central shaft.

21. The differential assembly of claim 19 wherein said locking means is a solenoid end pin lock mounted in said hollow axle.

* * * * *